United States Patent [19]

Masaki et al.

[11] 4,103,156
[45] Jul. 25, 1978

[54] LIGHT SCANNING DEVICE

[75] Inventors: Katsumi Masaki, Kodaira; Kazuhiro Hirayama, Yokohama; Yasushi Sato, Kawasaki, all of Japan

[73] Assignee: Canon Kabushiki Kaisha, Tokyo, Japan

[21] Appl. No.: 746,832

[22] Filed: Dec. 2, 1976

[30] Foreign Application Priority Data

Dec. 12, 1975 [JP] Japan ................................ 50-147862

[51] Int. Cl.² .............................................. H01J 3/14
[52] U.S. Cl. ..................................... 250/236; 250/563
[58] Field of Search ............... 250/234, 235, 236, 563, 250/572

[56] References Cited
U.S. PATENT DOCUMENTS 3,692,414  9/1972  Hosterman et al. ............. 250/236 X Primary Examiner—James B. Mullins
Attorney, Agent, or Firm—Fitzpatrick, Cella, Harper & Scinto

[57] ABSTRACT

A scanning device for deflecting a light beam, said device being constructed with a deflector such as, for example, a rotatory polygonal mirror, which causes a light incidence position on the deflecting and reflecting surface thereof to shift in accordance with the deflecting action of the deflector, a detector for detecting when the light incidence position is at a corner part of the deflecting and a reflecting surface, and light interceptor operable in accordance with a detection signal from the abovementioned detector, when the light incidence position reaches the corner part of the deflecting and reflecting surface, to interrupt incidence of the light beam onto the deflecting and reflecting surface.

4 Claims, 13 Drawing Figures

FIG. 1
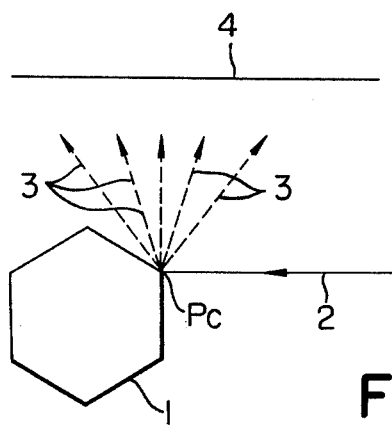
FIG. 2A
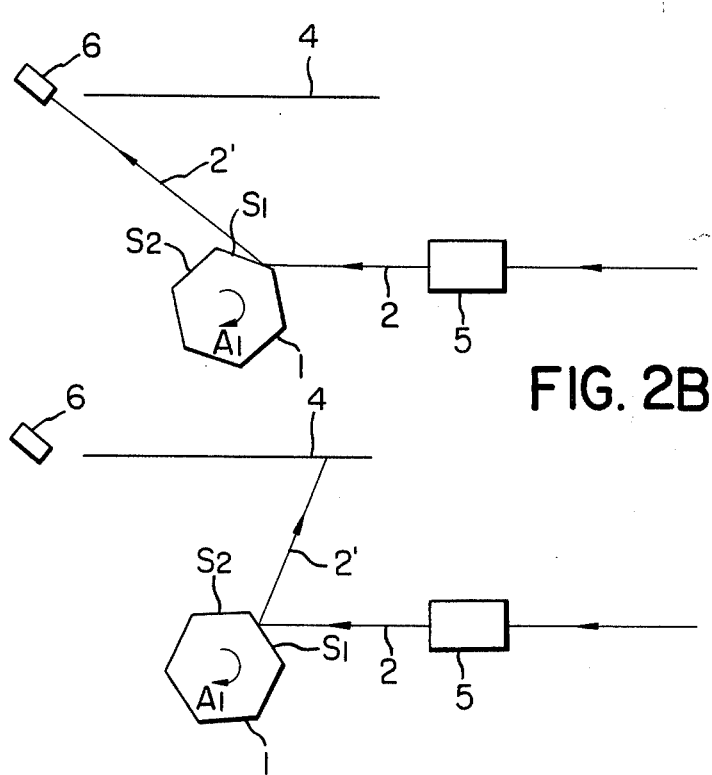
FIG. 2B

LIGHT SCANNING DEVICE

BACKGROUND OF THE INVENTION a. Field of the Invention

This invention relates to a light scanning device. More particularly, it is concerned with an improvement in a light scanning device having a deflector which causes a light incidence position on the deflecting and reflecting surface thereof to shift in accordance with its deflecting action.

b. Description of the Prior Art

The deflector which causes a light incidence position on the deflecting and reflecting surface thereof to shift in accordance with its deflecting action is represented by a rotatory polygonal mirror.

Since this deflector causes the light incidence position on the deflecting and reflecting surface thereof to shift by the deflecting action thereof, when the light incidence position reaches the boundary part of the reflecting surface (hereinafter referred to simply as "corner part"), the incident light beam is irregularly scattered at the corner part thereof. On account of this, such type of deflector is disadvantageous in that, when it is applied to the so-called "laser beam printer," wherein a write-in light beam is shifted on a photosensitive material by the deflector to record informations therein, the photosensitive material is inevitably sensitized by the light scattered at this corner part.

SUMMARY OF THE INVENTION

It is therefore an object of the present invention to provide a light scanning device which is capable of stopping the incidence of the light beam onto the corner part of the deflecting surface, when the light incidence position reaches the corner part of the deflecting surface.

In order to attain the abovementioned object, the light scanning device of the present invention comprises detecting means to detect an incidence position of the light beam on the deflecting surface, and means to stop incidence of the light beam onto the deflecting surface, the abovementioned stopping means being actuated to stop incidence of the light beam onto the deflecting surface in accordance with a detection signal from the abovementioned detecting means, which indicates that the light incidence position has reached the corner part of the deflecting surface.

BRIEF DESCRIPTION OF THE DRAWING

In the drawing:

FIG. 1 is a schematic plan view showing a conventional light scanning device;

FIGS. 2A to 2D respectively show the optical lay-out of a first embodiment according to the present invention, wherein FIG. 2A shows that an incidence position of a stationary light beam on the deflecting surface is at a commencing end of a deflecting surface on a rotatory polygonal mirror;

FIG. 2B shows that an incidence position of the light beam is at a terminating end of the deflecting surface;

FIG. 2C shows that the incidence position of the light beam is at the corner part of the deflecting surface on the rotatory polygonal mirror; and FIG. 2D shows that the light incidence position is on the subsequent deflecting surface of the polygonal mirror for scanning operation;

DETAILED DESCRIPTION OF PREFERRED EMBODIMENTS

Figure 2C:
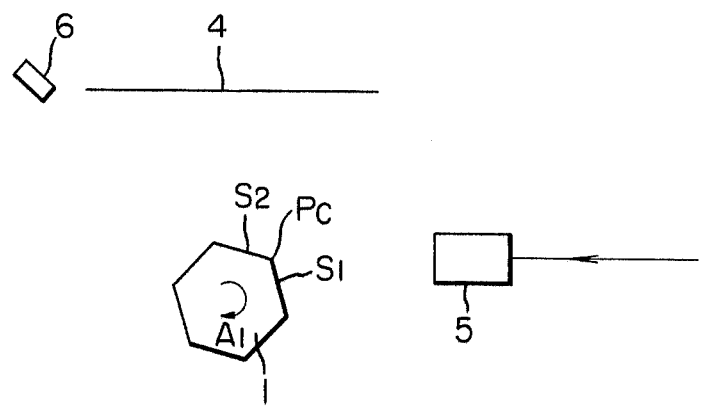
Figure 2D:
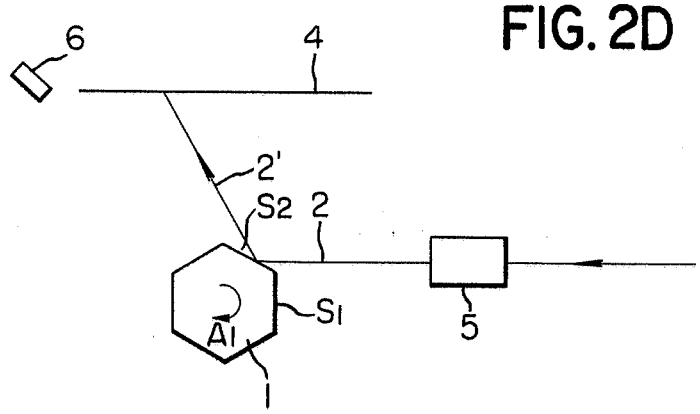

Referring now to FIG. 1 showing the conventional light scanning device, a light beam 2 impinging a polygonal mirror 1 is definitely scattered at the corner part Pc of the polygonal mirror as it rotates. While the light beam reflected in the neighboring region of the corner part Pc of the polygonal mirror is not usually used as the scanning light, the reflected light beam at this corner part Pc becomes scattered light 3 and is directed to the scanning surface 4. Thus, this scattered light constitutes a flare which badly hinders the image formation, reading of the information, and so forth on the scanning surface. For example, the contrast in the sensitized image is inevitably lowered by the abovementioned flare, and, in the case of the laser beam printer, the scanning light beam possibly gives rise to a risk to humans.

FIGS. 2A through 2D, 3, and 4 illustrate the first embodiment of the light scanning device according to the present invention, in which generation of the scattered light 3 is prevented.

In FIGS. 2A, 2B, 2C, and 2D, a reference numeral 5 designates an interceptor which is actuated in accordance with a signal from the light incidence position detector indicating that the light incidence position has reached the corner part of the polygonal mirror (hereinafter referred to simply as "corner position detection signal") to thereby intercept the stationary light beam and prevent incidence on the polygonal mirror. By the term "interception" as used in the present specification, it is meant that the light beam is prevented from impinging upon the polygonal deflecting surface, hence it is also meant to deviate the light beam from the polygonal deflecting surface. For the interceptor, it is preferable to use an AO modulator, a deflector consisting of a galvano-mirror and a slit in combination, an internal modulation type laser, in which a light source and an interceptor are integrally combined, and so forth. A reference numeral 6 designates a beam detector incorporated in the light incidence position detector to be detailed hereinafter.

When the polygonal mirror 1 rotates in the direction of arrow $A_1$, the stationary beam 2 is deflected by a deflecting surface $S_1$ to be turned into a scanning beam 2'. The scanning position on the scanning surface corresponds to the light incidence position on the deflecting surface $S_1$. Accordingly, by detecting the scanning position on the scanning surface, it becomes possible to detect the light incidence position on the deflecting surface. Moreover, since the shifting speed of the light incidence position can be made known beforehand, it is possible to know in advance a time period, within which the light incidence position shifts from a particular position to the corner part of the polygonal mirror. As a result, once a certain particular scanning position on the scanning surface is detected, it becomes possible to know in advance the time period, within which the light incidence position moves to the corner part.

In the state as shown in FIG. 2A, wherein the scanning beam is at the commencing end of the deflecting surface, a corner position detection signal can be obtained by delaying a signal from the beam detector 6 for a certain time interval.

Figure 3:
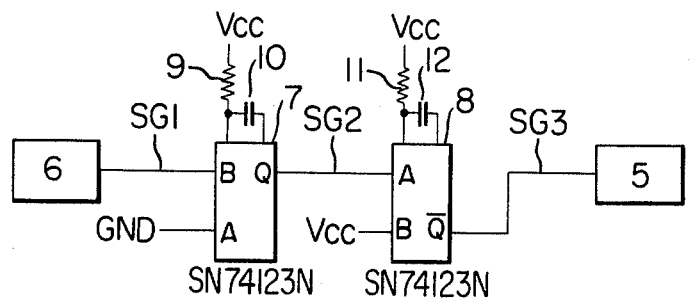
FIG. 3 is a circuit diagram of a light incidence position detector for use in the first embodiment shown in FIG. 2.
Figure 4:
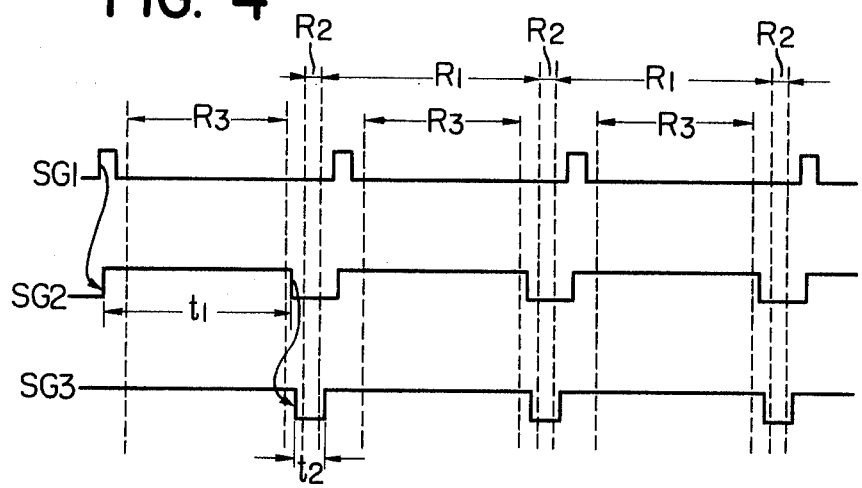
FIG. 4 is a time chart for the electric circuit shown in FIG. 3.

The construction of the corner position detection signal generator is as shown in FIGS. 3 and 4, in which a signal $SG_1$ from the beam detector 6 is fed, as an input trigger pulse, to an input terminal B of a monostable multi-vibrator 7, after it is subjected to waveform shaping. The monostable multi-vibrator 7 used in this circuit is "74123N" of Texas Intrument Inc., U.S.A. From an output terminal Q of this monostable multi-vibrator 7, there is obtained a signal $SG_2$ which rises in response to the rise in the trigger pulse $SG_1$ and trails after a time interval $t_1$. This time interval $t_1$ corresponds to a time interval $R_3$ for scanning a write-in region 4, and is established by a resistor 9 and a capacitor 10 of the monostable multi-vibrator 7.

The output signal $SG_2$ from the monostable multi-vibrator 7 is fed, as an input, to an output terminal A of a second monostable multi-vibrator 8. This second monostable multi-vibrator 8 also consists of "74123N" of Texas Instrument Inc.. From an output terminal $\overline{Q}$ of this monostable multi-vibrator 8, there is obtained an output signal $SG_3$ which trails in response to the trailing of the input signal $SG_2$ and rises after a time interval $t_2$. This time width $t_2$ corresponds to a time width $R_2$, within which an incident light 2' passes through the corner part on the deflecting surface. However, this time $t_2$ never surpasses a time interval, within which the incident light beam reaches a position on the deflecting surface $S_2$ where a scanning beam entering into the beam detector 6 is obtained. An output signal $SG_3$ from this second monostable multi-vibrator 8 enters into the interceptor as an input. As the result of this, the stationary beam 2 is prevented from impinging on the corner part Pc of the polygonal mirror, as shown in FIGS. 2A to 2D, and no scattered light as already mentioned in the foregoing is generated.

In the following, explanation will be given for a case, in which an image information is recorded on a write-in surface 4 positioned at one part of the scanning surface by imparting a modulation to the stationary beam in accordance with the image information from a computer. For the method of recording the image information, there are two ways of exposing the image information portion without exposing a marginal portion (the positive method), and of exposing the marginal portion without exposing the image information portion (the negative method).

In the case of the positive method, the modulation of the stationary beam in accordance with the image information from the computer is carried out only while the scanning beam is scanning the write-in region (vide: the time width $R_3$ in FIG. 4). Accordingly, the stationary beam has been intercepted when the stationary beam will be projected onto the corner part of the polygonal mirror (vide: the time width $R_2$ in FIG. 4). On account of this, scattered light cannot occur in the case of the ordinary positive method.

However, in a write-in device of a type as proposed in pending U.S. application Ser. No. 616,675, now U.S. Pat. No. 4,059,833, a detector similar to the detector 6 in FIG. 2A is disposed prior to commencement of one scanning operation so as to obtain a write-in start signal, and, for the purpose of directing the light beam to this detector, the light beam is turned on after completion of the scanning operation in the write-in scanning region. When this light beam is projected onto the corner part of the polygonal mirror, there inevitably occurs the scattered light.

Figure 5:
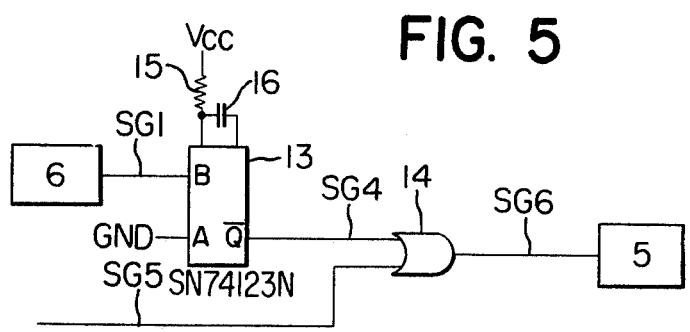
FIG. 5 is a circuit diagram of a light incidence position detector for use in the second embodiment of the present invention.
Figure 6:
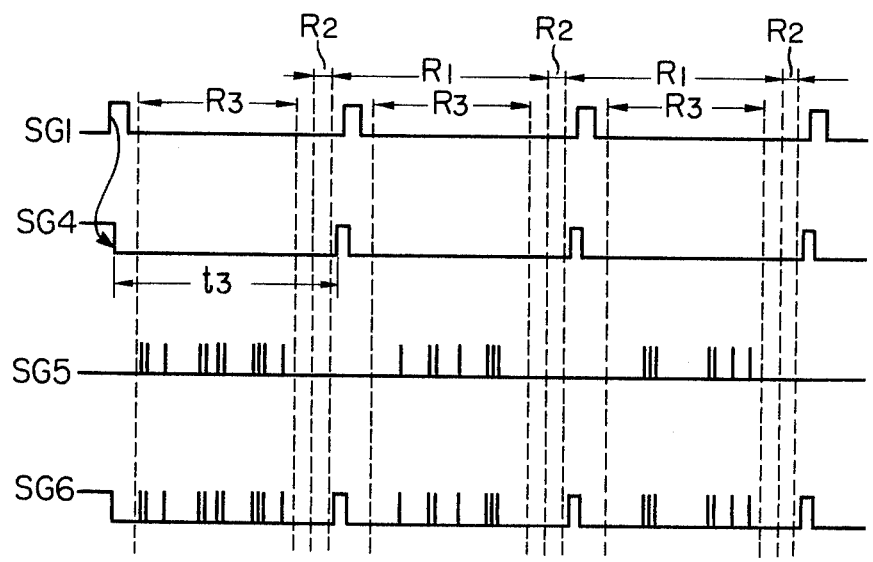
FIG. 6 is a time chart for the electric circuit shown in FIG. 5.

The second embodiment shown in FIGS. 5 and 6 is of such construction that the light beam for the beam detection is turned on after it has passed through the corner part of the polygonal mirror. Further, in this embodiment, the interceptor 5 and the modulator to modulate the stationary beam in accordance with an image information are made common.

In the electric circuit for the position detector to be used in the second embodiment, a signal $SG_1$ from the beam detector 6 is fed, as an input, to an input terminal B of a chip 13 consisting of SN74123N of Texas Instrument Inc., U.S.A. From an output terminal $\overline{Q}$ of this chip 13, there is produced an output signal $SG_4$ which trails in response to the rise in the signal $SG_1$, and which rises after lapse of a time $t_3$. This time width $t_3$ is sufficient for the stationary beam 2 to pass through the corner part Pc formed by the deflecting surfaces $S_1$ and $S_2$. This output signal $SG_4$ is fed to an "OR" circuit 14 as an input. On the other hand, the signal $SG_1$ from the beam detector 6 is fed, as an input, to a read-out start signal generator (not shown). An image signal $SG_5$ from the computer is produced as an output on the basis of the read-out start signal from this generator. This output signal $SG_5$ is fed to the "OR" circuit 14 as an input, from which an output signal $SG_6$ is accordingly obtained. By applying this output signal $SG_6$ to the light interceptor/modulator 5 as an input, modulation of the stationary beam during its scanning on the write-in region is performed, and, at the same time, the light beam for the beam detection is obtained after it has passed through the corner part of the polygonal mirror.

Figure 7:
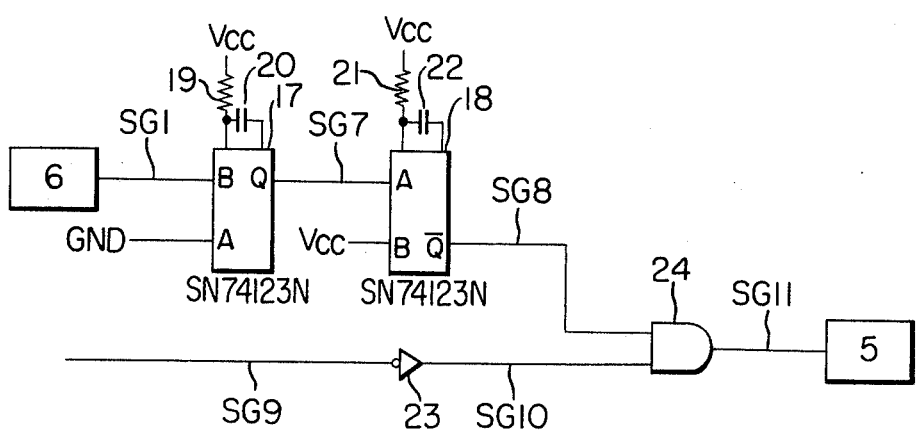
FIG. 7 is a circuit diagram of a light incidence position detector for use in the third embodiment of the present invention.
Figure 8:
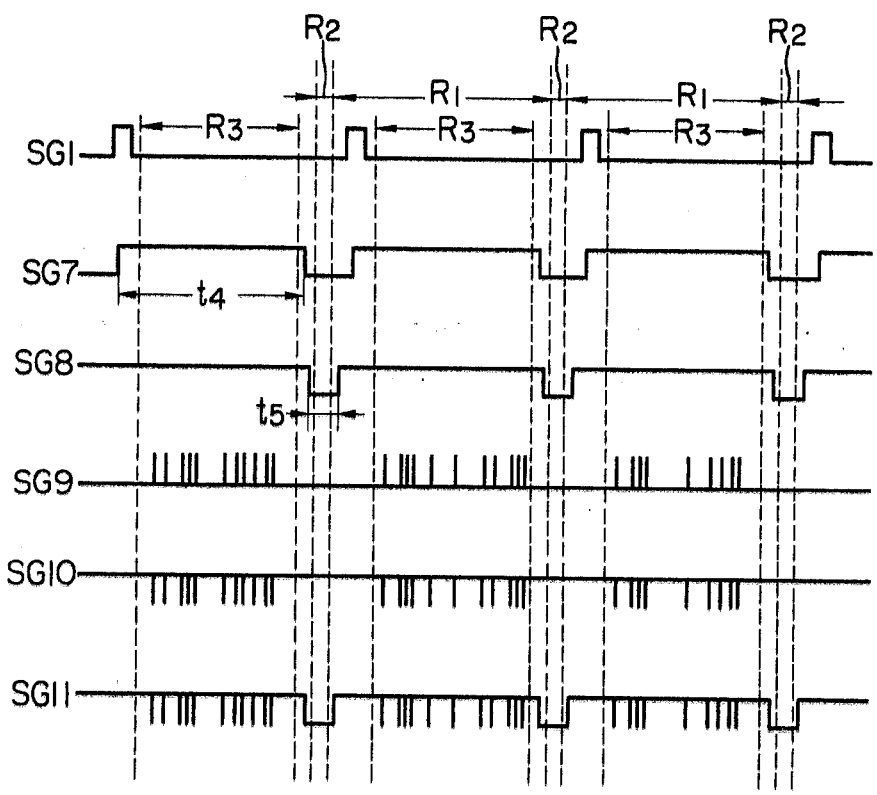
FIG. 8 is a time chart for the electric circuit shown in FIG. 7.

FIGS. 7 and 8 illustrate the third embodiment of the present invention, in which the negative method is adopted. A signal $SG_1$ from the beam detector 6 is fed, as an input, to an input terminal B of a chip 17 consisting of SN74123N of Texas Instrument Inc., U.S.A. From an output terminal Q of this chip 17, there is obtained a signal $SG_7$ which rises in response to the rise in the signal $SG_1$ and which trails after lapse of a time interval $t_4$. This time width $t_4$ corresponds to a time required for scanning the write-in region 4. The output signal $SG_7$ from the chip 17 is fed, as an input, to an input terminal A of a second chip 18. This second chip 18 also consists of SN74123N of Texas Instrument Inc., U.S.A. From an output terminal $\overline{Q}$, there is obtained an output signal $SG_8$ which trails in response to the trailing in the signal $SG_7$, and which rises after a lapse of time $t_5$. This time width $t_5$ corresponds to a time width $R_2$, within which the stationary beam 2 passes through the corner part Pc of the polygonal mirror. This signal $SG_8$ is fed to an "AND" circuit 24 as an input. In the same manner as in the previous embodiment, an image signal $SG_9$ is converted to a signal $SG_{10}$ by an inverting circuit 23, and the signal $SG_{10}$ is applied to the "AND" circuit 24 as an input. In this consequence, an output signal $SG_{11}$ is obtained from this "AND" circuit 24. The output signal $SG_{11}$ is further applied, as an input, to the interceptor/modulator 5, with the consequence that the time width $R_3$ required for scanning the write-in region 4 imparts a modulation to the stationary beam 2, and, when this modulated stationary beam 2 is about to be projected onto the corner part of the polygonal mirror, it is intercepted.

In the following, explanations will be given utilizing a laser beam printer as an example, in which the light scanning device according to the present invention is incorporated.

Figure 9:
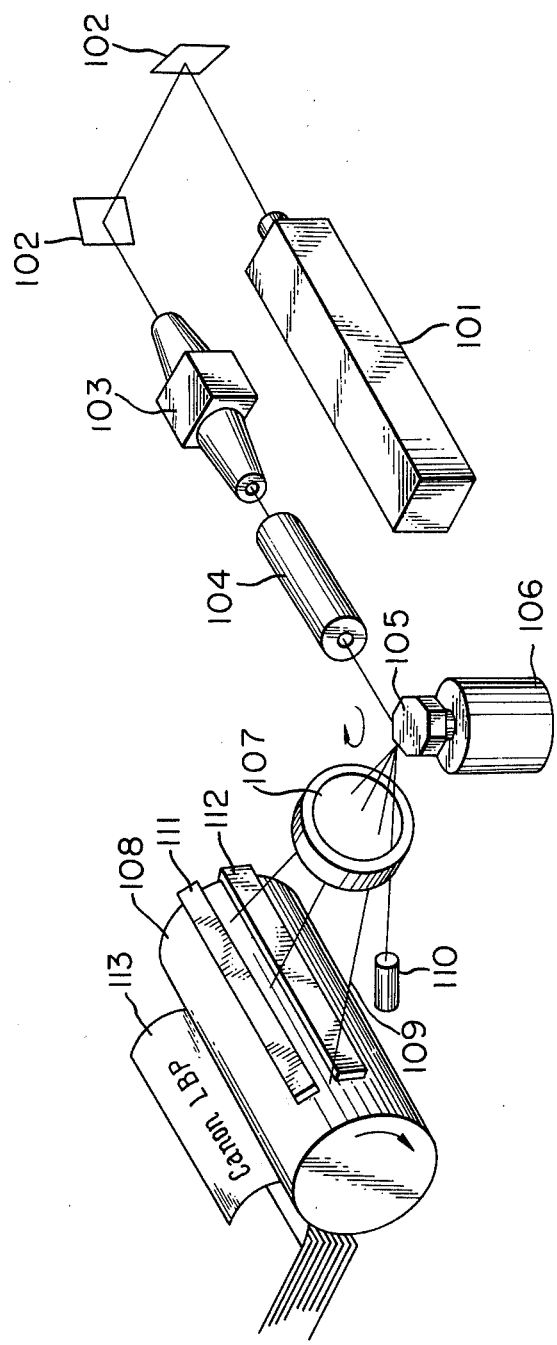
FIG. 9 is a perspective view showing a schematic optical lay-out of the laser beam printer, in which the light scanning device of the present invention is incorporated.

FIG. 9 is a perspective view showing one embodiment of the optical system for the laser beam printer. In the illustration, laser beam which has been oscillated from a laser oscillator 101 is introduced into an input opening of a modulator 103 through reflecting mirrors 102, 102. This modulator 103 corresponds to the modulator 5 above referred to. For the modulator 103, there is used a known type of acousto-optical modulating element, or electro-optical element utilizing the electro-optical effect. The laser beam is subjected to modulation, both strong and weak, by an input signal to be described later. The laser beam from the modulator 103 is forwarded to a beam expander 104 where its beam diameter is expanded, while it is being maintained in a parallel light beam. Further, the laser beam from the beam expander 104 is projected onto a rotary polygonal mirror 105 having on its peripheral surface one or a plurality of mirror surfaces. The rotary polygonal mirror 105 is mounted on a shaft supported on a high precision bearing, and is rotated by a motor 106 at a constant rotational speed. Laser beam 109 which has been deflected and reflected by the rotary polygonal mirror 105 is focussed on a photosensitive drum 108 by means of an f-$\theta$ lens 107. A numeral 110 refers to a beam detector which comprises a small incident slit and a photoelectric conversion element having a quick response characteristic. An output signal from the beam detector 110, besides intercepting the laser beam entering into the rotatory polygonal mirror 105 as mentioned in the foregoing, also determines the timing for starting an input signal to the modulator 103 to impart a desired light information onto the photosensitive drum 108 through detection of a position of the laser beam 109. A reference numeral 111 designates a first corona charger, and 112 refers to an a.c. corona discharger, both constituting a part of the electrophotographic process. As mentioned above, the laser beam 109 which has been deflected and modulated is irradiated onto a photosensitive drum 108. An image on the photosensitive drum 108 irradiated by the laser beam 109 is developed by the electrophotographic process to be rendered a visual image, after which it is transferred and fixed onto a plain paper, and finally discharged as an output hard copy 113.

Figure 10:
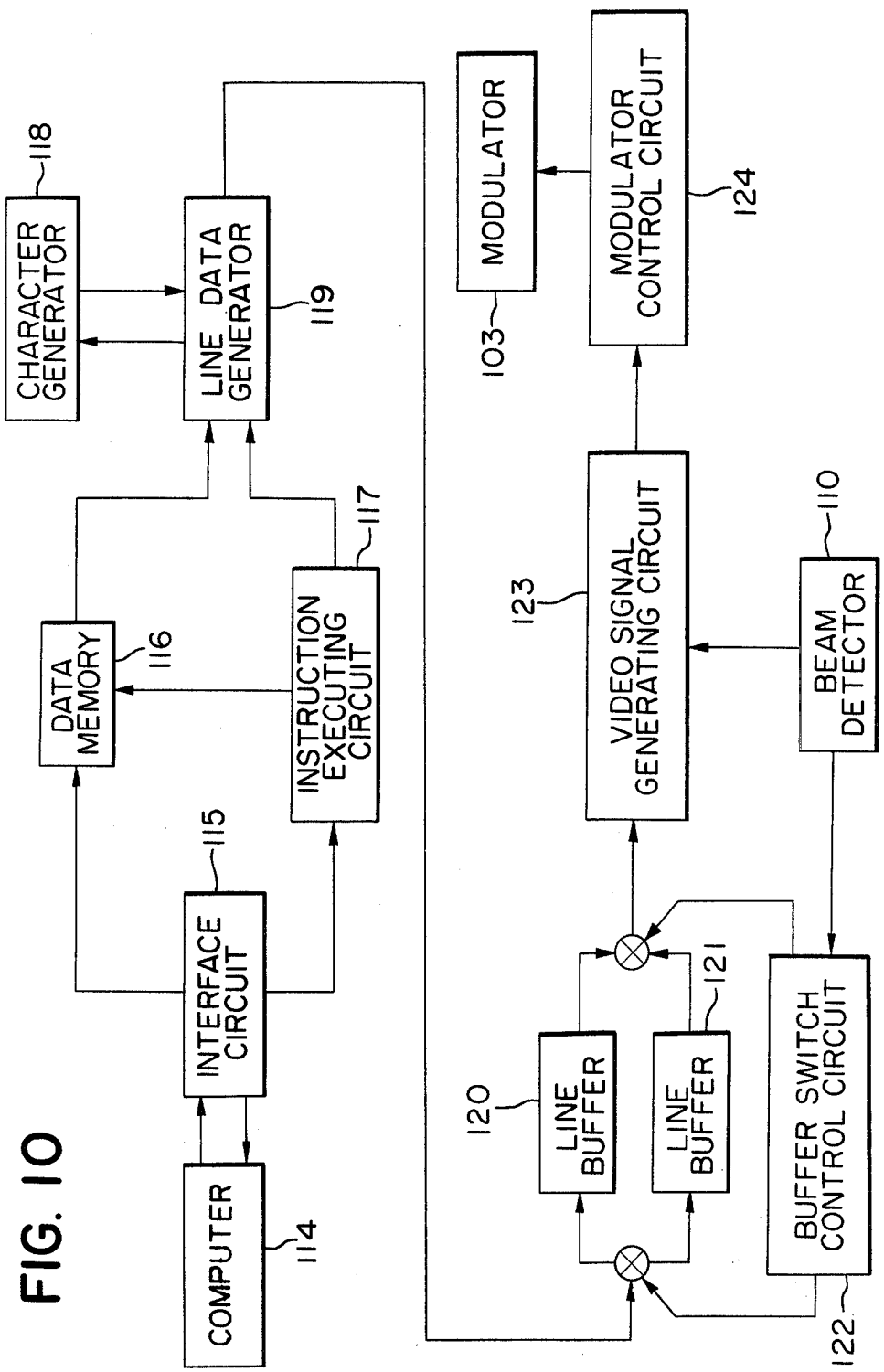
FIG. 10 is a block diagram for electrical control of the device shown in FIG. 9.

Next, explanations will be given in the following in reference to FIG. 10 on a series of operations from receiving of a pattern and character informations by a computer upto preparation of a desired hard copy by the use of the light scanning device according to the embodiment of the present invention. Informations from the computer 114 is fed, as an input, to an interface circuit 115 of the present device either directly or through a recording medium such as magnetic tape, magnetic disc, and so on in the form of a format. Various instructions and directions from the computer are deciphered and executed in an instruction executing circuit 117. Data are stored in a data memory 116 for a certain definite quantity. The form of data to be stored in the memory circuit is given in a binary code in the case of a character information, while, in the case of a pattern information, they are given either in the form of a unit picture element constituting the pattern, or lines constituting the pattern (the so-called vector data). These modes of the data for storage are designated in advance of the data storage, and the instruction executing circuit 117 controls the data memory 116 and a line data generator 119 so as to treat these data in accordance with the designated mode. The line data generator 119 generates a final data for one scan line. That is, when the data are given in character codes, the data for modulating the laser beam for one scan line are sequentially prepared either by reading the character patterns out of a character generator 118 and arranging the character patterns for one line to form a buffer, or by forming a buffer of the character code for one line to sequentially read out the character patterns from the character generator 118. Even when the data are the pattern informations, the data for modulating the laser beam for one scan line are sequentially produced by converting these data into the scan line data. The data for one scan line are alternately fed, as inputs, to line buffers 120 and 121, which comprise shift registers, etc. having certain numbers of bit equal to the numbers of picture element for one scan line, by controlling a buffer switch control circuit 122. Further, the data from the line buffers 120 and 121 drives the buffer switch control circuit 122 with a beam detection signal from the beam detector 110 as the trigger signal, whereby one bit for one scan line is sequentially read out. The signals from the line buffers 120 and 121 enter as the input signals into a video signal generating circuit 123 together with the signal from the beam detector 110. This video signal generating circuit 123 corresponds to the circuits shown in FIGS. 3, 5, and 7, respectively, hence the signals to enter as input signals from the line buffers 120 and 121 into the video signal generating circuit 123 correspond to the above-mentioned image signals $SG_5$ and $SG_9$. The signal from the video signal generating circuit 123 enters into a modulator control circuit 123 as an input to control the modulator 103. Accordingly, when the scanning beam is projected onto the corner part of the rotatory polygonal mirror 105, the scanning beam is intercepted by the modulator 103, whereby generation of the flare can be prevented.

As stated in the foregoing, the present invention proposes that, when a radiation beam is deflected and scanned by scanning means having the reflecting surfaces, and the radiation beam thus scanned is projected onto a corner part of the scanning means, the incidence of the scanned radiation beam into the scanning means is prevented to thereby avoiding undesirable flare in the radiation beam to be possibly generated at the corner part of the scanning means. Therefore the present device has an excellent effect in comparison with the conventional scannning means.

In the afore-described embodiments according to the present invention, the incidence position of the stationary beam onto the deflecting surface is detected at the position of the scanning beam. However, the incidence position detector of the present device is not limited to this type alone, but other type of the detector, which carries out the detection of the light incidence position at a rotational position of the rotatory polygonal mirror, may equally be used. For example, a magnet is fixed at a predetermined position on the rotational shaft of the deflecting mirror or polygonal mirror to detect passage of the magnet by a hole element, the detection signal of which is utilized in the same way as the detection signal obtained from the beam detector.

What is claimed is:

1. A scanning device for reflecting a light beam, comprising:
   a. a light source for emitting a light beam;
   b. a deflector having a reflecting surface which receives the light beam from said light source;
   c. means to detect the incidence position of the light beam on the reflecting surface of said deflector; and
   d. light intercepting means to interrupt the incidence of the light beam on said reflecting surface in accordance with a detection signal from said detector means indicating that the incidence position of said light beam has shifted to the corner of said reflecting surface.

2. The device as claimed in claim 1, wherein said light source is a laser light source.

3. The device as claimed in claim 1, wherein said deflector is a rotatory polygonal mirror.

4. A scanning device for deflecting a light beam, comprising:
   a. light source for emitting a light beam;
   b. a deflector for deflecting the light beam along a scanning line, wherein the incidence position of the light beam from the light source shifts during scanning;
   c. light incidence position detecting means having a light beam detector disposed on the scanning line of the scanning light from said deflector; and
   d. a light interceptor disposed between said light source and said deflector and responsive to an output signal from said light incidence position detecting means.

* * * * *